United States Patent [19]

Hervert

[11] 4,031,292

[45] June 21, 1977

[54] METHOD FOR THE PREPARATION OF AN ELECTROCATALYST

[75] Inventor: George L. Hervert, Woodstock, Ill.

[73] Assignee: UOP Inc., Des Plaines, Ill.

[22] Filed: Apr. 19, 1976

[21] Appl. No.: 678,003

[52] U.S. Cl. .................................................. 429/40
[51] Int. Cl.$^2$ ........................................ H01M 4/00
[58] Field of Search .................. 429/40, 42, 44; 204/290 R

[56] References Cited

UNITED STATES PATENTS 3,881,957  5/1975  Hausler .......................... 204/290 R Primary Examiner—John H. Mack
Assistant Examiner—H. A. Feeley
Attorney, Agent, or Firm—James R. Hoatson, Jr.; Raymond H. Nelson; William H. Page, II

[57] ABSTRACT

Electrocatalysts which may be used in the preparation of electrodes for electrochemical cells such as fuel cells comprising a refractory inorganic oxide having a carbonaceous pyropolymer forming at least a monolayer on the refractory oxide, the surface of said pyropolymer having at least one catalytically active metal impregnated thereon may be prepared by treating a refractory inorganic oxide with a pyrolyzable organic compound to form at least a monolayer of a carbonaceous pyropolymer on the surface of said refractory inorganic oxide, thereafter impregnating the resulting composite with a complex of a soluble salt of at least one catalytically active metal and a sulfur-containing carboxylic acid, heating the impregnated composite to remove the solvent, reducing the dried composite and thereafter recovering the resultant electrocatalyst.

15 Claims, No Drawings

METHOD FOR THE PREPARATION OF AN ELECTROCATALYST

The Invention herein described was made in the course of or under a contract or subcontract thereunder with the Department of the Army.

BACKGROUND OF THE INVENTION

This invention relates to a method for the preparation of an electrocatalyst which may be utilized as an electrode for an electrochemical cell as described in U.S. Pat. No. 3,651,386.

An electrochemical cell is basically comprised of an anode and a cathode positioned in an electrolyte and connected in an external circuit, although many variations of the physical arrangement of the three components are possible. An electrochemical cell is a device which permits the performance of oxidation or reduction reactions electrochemically, that is, by way of an electron transfer reaction at an electrode-electrolyte interface. Oxidation reactions take place at the anode while reduction reactions take place at the cathode.

Electrochemical cells can be classified according to their use. Some produce energy and are called batteries. Others are used to produce chemicals under the use of energy and are called electrolysis cells.

There are a great many different types of energy producing electrochemical cells, such as primary batteries, secondary batteries, fuel cells and batteries which are combinations where one electrode may be a fuel cell electrode, the other a conventional battery electrode, such as is the case in the zinc-air battery.

If the cell is a fuel cell, fuel is supplied from an external source to the anode where it is oxidized, thereby freeing electrons which flow in the external circuit. The oxidation of the fuel also results in the production of hydrogen ions at the anode. These hydrogen ions pass through the electrolyte to the cathode, where they combine with oxygen and electrons to form water. Electrodes of a fuel cell may be of the diffusion type, and usually are porous and have at least one surface impregnated with a catalyst, such as the catalyst substance of this invention. Chemical and catalytic action takes place only at the interface between the electrolyte, the reacting gas, and an electrode.

As it is desirable to design an electrochemical cell so as to increase the surface of this interface, the electrodes are often constructed with at least one surface of a porous material and with a hollow interior. The reacting fuel gas and the oxygen are forced into the interior of the pores of the respective electrodes where the gases meet the electrolyte. The electrochemical reactions take place at a three phase boundary area. It is at this boundary area of the anode or cathode that oxidation of the fuel and reduction of the oxygen takes place, thereby producing electricity in the external circuit, and it is this boundary area that has to have catalytic activity.

Fuel cells are often classified on the basis of their mode of operation. Typical high temperature fuel cells which operate at 800° to 1200° C. use solid electrolytes and gaseous fuels. Molten salt electrolytes are used in fuel cells operating at temperatures from 400° to 800° C. They use gaseous fuels also. Low temperature fuel cells operate at temperatures from ambient to 200° or 300° C. use liquid, dissolved or gaseous fuels. The oxidizing agent in most fuel cells is air, although others such as chlorine gas may be used as well. The range of available fuels is much larger. Examples are hydrogen, alcohols, hydrazine, hydrocarbons, and many more. The power which can be obtained from a battery is given by the current which can be drawn under a given voltage. It is characteristic of all chemical energy conversion devices that the voltage difference between the anode and cathode decreases as the current goes up. This voltage decrease is called polarization. Since one always attempts to obtain highest power output possible, one is constantly striving to reduce the polarization of the fuel cell electrodes. This is achieved by increasing the temperature of operation or by the use of an electrocatalyst such as is claimed in this invention.

The electrodes are often composed of a structural base section and a catalyst material mounted on the base. The structural base section usually takes the form of conductive screens or gauzes. The electrode is held in place by an electrically conductive holder having an opening. It is upon this opening that the electrode is mounted. The holder is made of electroconductive material, such as copper, silver, carbon and the like. The holder is directly conducted to the electric terminal of the external circuit and is hollow with an inlet opening through which fuel or oxygen (air) may be supplied to one side of the electrode. The electrode assembly is located below the surface of the electrolyte such that the other surface of the electrode is in contact with this electrolyte.

A typical gas diffusion electrode used in the manner described above permits the fuel gas or oxygen or air to diffuse into the interior of the pores of the electrode from one side while the electrolyte penetrates the pores from the electrolyte side. In this manner, an extended area or interface for three phase contact is achieved.

This is often brought about by incorporating a certain hydrophobicity to the electrolyte by compacting the catalyst material with a hydrophobic powderous plastic material or by such techniques as spraying one surface with a solution of Teflon, oil, or other polymeric materials, or any other suitable means. Appropriate plastic polymers include porous polytetrafluoroethylene, porous polyethylene, porous polyurethane foams, polystyrene, cellophane, polyvinylidene chloride, polyvinyl chloride, polyvinyl ethyl ether, polyvinyl alcohol, polyvinyl acetate, polypropylene cellulose, polymethyl methacrylate, butadiene-styrene copolymers, styrenated alkyd resins, some poly-epoxide resins, and chlorinated rubber.

The success of an electrochemical cell using a catalyst is fundamentally measured by the cost of producing electricity in the cell. Factors which are determinative of this cost include the temperature at which, for example, a fuel cell must be maintained during operation, the coulombic efficiency at which the fuel is oxidized, the cost of the fuel used, the cost of the catalyst used, and the life or stability of the catalyst, and finally the thermodynamic efficiency.

An important object of fuel cell development is to obtain high discharge voltage at current rates which produce a good watt/pound ratio. This can be achieved if the current-voltage characteristic of the electrode is close to the theoretical Tafel slope and exhibits a minimum of overvoltage.

The prior art has disclosed various fuel cell electrode catalysts which may be used in an electrochemical cell. For example U.S. Pat. No. 3,857,737 discloses a fuel cell electrode catalyst comprising a noble metal catalyst such as platinum deposited on particles of an inert carrier such as carbon, the catalyst being prepared by admixing the carbon powder with a salt of platinum to form a slurry followed by concentration and drying. Likewise, U.S. Pat. No. 3,364,074 discloses a carbon containing electrode which is contacted with an organic solution containing a wetproofing agent for the electrode and an organometallic compound, the electrode then being heated at a temperature sufficient to decompose the organic portion of the organometallic compound to form the desired electrode. Another U. S. patent which discloses an electrochemical cell in U.S. Pat. No. 3,881,957 in which a support such as an inorganic refractory oxide may be preimpregnated with a metal and thereafter the inorganic refractory oxide containing a coating of the catalytic metal is heated in an atmosphere containing an organic pyrolyzable material whereby a pyropolymer is deposited on the surface of the support. However, the electrocatalyst thus prepared possesses a drawback or defect in that the temperature which is required to pyrolyze the organic pyrolyzable substance is of the magnitude of from about 400° to about 900° C., the preferred range being from about 850° to about 900° C. The use of a temperature of this magnitude wil agglomerate the metal crystallites and increase the size of the crystal. This increased crystal size may be deleterious to the function of the electrocatalyst due to the fact that the surface of the catalytic metal will be minimized and will therefore decrease the activity of the electrocatalyst. As will hereinafter be shown in greater detail, in contradistinction to this method of preparing an electrocatalyst, the process of the present invention will permit the preparation of an electrocatalyst wherein the catalytic metal is impregnated on the surface of the carbonaceous pyropolymer at temperatures which will not disturb the crystallite size of the metal and therefore the crystallite size will remain in a desired range.

SPECIFICATION

This invention relates to a method for the preparation of an electrocatalyst which may be utilized in electrodes which form an element in an electrochemical cell. More specifically, the invention is concerned with a method whereby the electrocatalyst of the type hereinafter set forth in greater detail will possess the catalytically active metal in a preferred particle size.

As hereinbefore set forth the electrochemical cells are basically made up of an anode and a cathode positioned in an electrolyte and connected in an external circuit, one type of electrochemical cell being a fuel cell. The electrodes which make up a part of said electrochemical cells will contain, as one component thereof, an electrocatalyst.

It is therefore an object of this invention to provide a method for the preparation of electrocatalysts for use in an electrochemical cell whereby the electrodes of which the electrocatalyst is one element will function in an efficient manner for a relatively long period of time in a stable manner.

In one aspect an embodiment of this invention resides in a method for the preparation of an electrocatalyst which comprises treating a refractory inorganic oxide with a pyrolyzable organic compound at pyrolysis conditions to form at least a monolayer of a carbonaceous pyropolymer on the surface of said refractory inorganic oxide, thereafter impregnating the resulting composite with a complex of a soluble salt of at least one catalytically active metal and a sulfur-containing carboxylic acid, heating the impregnated composite to a temperature sufficient to remove the solvent, reducing the dried composite and recovering the resultant electrocatalyst.

A specific embodiment of this invention is found in a method for the preparation of an electrocatalyst which comprises treating gamma-alumina with benzene at a temperature in the range of from about 400° to about 1200° C. in a reducing atmosphere whereby at least a monolayer of a carbonaceous pyropolymer is deposited on the surface of said gamma-alumina, thereafter impregnating the composite with a complex of a soluble salt of platinum and thiomalic acid, heating the impregnated composite to a temperature in the range of from about 100° to about 250° C., reducing the dried composite in the presence of hydrogen at a temperature in the range of from about 100° to about 600° C. and recovering the resultant electrocatalyst.

Other objects and embodiments will be found in the following further detailed description of the present invention.

As hereinbefore set forth the present invention is concerned with a method for the preparation of electrocatalysts which may be used in electrodes. The performance of fuel cell electrocatalysts of the type hereinafter set forth in greater detail will be substantially improved when both the particle size of the catalyst particulate and the crystallite size of the promoter metal or combination of metals are at a minimum value. In order to produce high level performance fuel cell electrocatalysts which contain the catalytic metal in small sized crystallites with minimum of metal crystallite agglomeration, the electrocatalysts must be prepared in such a manner so that the deposition of the catalytically active metal on the surface of the carbonaceous pyropolymer coated refractory inorganic oxide must be effected in such a manner whereby the metal crystallites are prevented from agglomerizing. In order to effect this particular type of deposition, the catalytically active metal is complexed with a compound which is present, preferably in a molar excess over the metal, whereby the crystallite size of the metal and the agglomeration are at a minimum. The electrocatalyst which is prepared according to the process of this invention will comprise a refractory inorganic oxide possessing a surface area of from 1 to about 500 square meters per gram and a carbonaceous pyropolymer forming at least a monolayer on said refractory oxide, the surface of said carbonaceous pyropolymer having at least one catalytically active metal impregnated thereon. The electrocatalyst thus described will possess a conductivity at room temperature of from about $10^{-8}$ to about $10^{+2}$ inverse ohmcentimeters. This electrocatalyst which forms one element of an electrode for electrochemical cells such as phosphoric acid electrolyte fuel cells will be used in place of the noble metal impregnated carbon electrocatalysts which have been used in the prior art.

The electrocatalyst of the present invention may be prepared by treating a refractory inorganic oxide of the type hereinbefore set forth, that is, a refractory inorganic oxide possessing a surface area of from 1 to about 500 square meters per gram, with a pyrolyzable organic compound at temperature conditions which are sufficient to pyrolyze the inorganic compound to form a carbonaceous pyropolymer containing carbon and hydrogen atoms in recurring units. Examples of refractory inorganic oxides which may be treated with the pyrolyzable organic compound will include aluminas such as gamma-alumina, eta-alumina, theta-alumina, silica, alumina-silica, etc. In one method of preparing the composite, the refractory inorganic oxide is heated to a temperature of from about 400° to about 1200° C. in a reducing atmosphere containing an organic pyrolyzable compound. The organic pyropolymer precursors most commonly and preferably used for the purposes of this invention are members of the group consisting of aliphatic hydrocarbons, aliphatic halogen derivatives, aliphatic oxygen derivatives, aliphatic sulfur derivatives, aliphatic nitrogen derivatives, organometallic compounds, alicyclic compounds, aromatic compounds, and heterocyclic compounds. Of the aliphatic hydrocarbons, the more common classes which may be utilized to perform this invention are alkanes, alkenes, alkynes, and alkadienes. Ethane, propane, butane and pentane are among the alkanes which may be successfully used in the performance of this invention. Similarly, alkenes which suffice include ethene, propene, 1-butene, 2-butene, and 1-pentene. Alkynes which may be successfully used include ethyne, propyne, 1-butyne, 2-butyne, 1-pentyne, and 1-hexyne. 1,3-Butadiene and isoprene are included among the alkadienes which may be utilized. Among the aliphatic halogen derivatives which suffice for the purposes of this invention are monohaloalkanes, polyhaloalkanes, and unsaturated halo compounds. In the monohaloalkane subgroup, chloromethane, bromoethane, 1-iodopropane, and 1-chlorobutane may be used. Polyhaloalkanes such as carbon tetrachloride, chloroform, 1,2-dichloroethane, and 1,2-dichlorobutane may also be utilized. One unsaturated halo compound which may be utilized is chloroprene.

The aliphatic oxygen derivatives appropriate for use in this invention include the classes of alcohols, ethers, halohydrides and alkene oxides, saturated aldehydes and ketones, unsaturated aldehydes and ketones, ketenes, acids, esters, salts and carbohydrates. Various alcohols which may be utilized include ethanol, 2-butanol, 1-propanol, glycol, (e.g. 1,3-propane-diol), and glycerol. Ethers utilized include ethyl ether, and isopropyl ether. Approprate halohydrins and alkene oxides include ethylene chlorohydrin, propylene chlorohydrin, ethylene oxide, and propylene oxide. Suitable saturated aldehydes and ketones include formaldehyde, acetaldehyde, acetone, and ethyl methyl ketone. Unsaturated aldehydes and ketones which may be used include propenol, trans-2-butenal, and butenone. Ketene has also been successfully used as an organic pyrolyzable substance. Likewise, formic acid, acetic acid, oxalic acid, acrylic acid, chloroethanoic acid, formic anhydride, and formyl chloride may also be utilized. Esters such as methyl formate, ethyl formate, and ethyl acetate may also be used. Salts such as sodium formate, potassium acetate, and calcium propionate may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ehtyl mercaptan and n-propyl mercaptan. Among the alkylthioalkanes usable are the thioethers, alkyl sulfides, methyl sulfide, ethyl sulfide and methyl propyl sulfide. Ethyl sulfonic acid and n-propyl sulfonic acid are sulfonic acids which may also be successfully used. Ethyl sulfate and sodium laurel sulfate are also appropriate for use.

The broad class of aliphatic nitrogen derivatives may be broken down into the subclasses of nitroalkanes, amides, amines, nitriles, and carbylamines. Nitroethane and 1-nitropropane are exemplary of suitable nitroalkanes while acetamide and propionamide are among the appropriate amides. Amines such as dimethylamine and ethylmethylamine, nitriles such as acetonitrile and propionitrile, and carbylamines such as ethyl isocyanid may also be used for the organic pyrolyzable substance of this invention. Organometallic compounds such as tetraisopropyl titanate, tetrabutyl-titanate, and 2-ethylhexyl titanate may also be used.

Particularly appropriate and preferred for use as the organo pyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones, aromatic acids, aromatic sulfur derivatives, and aromatic nitrogen compounds may also be utilized. Among the many suitable hydrocarbons, benzene, naphthalene, anthracene, and toluene were successfully utilized. Benzyl chloride and benzal chloride are appropriate halogen compounds while phenol, o-cresol, benzyl alcohol and hydroquinone are among the suitable derivatives. Ethers such as anisole and phenetole and aldehydes, ketones, and quinones, such as benzaldehyde, acetophenone, benzophenone, benzoquinone, and anthraquinone may also be used. Aromatic acids such as benzoic acid, phenylacetic acid, and hydrocinnamic acid may be utilized while the aromatic sulfur derivative of benzenesulfonic acid will also serve successfully. The aromatic nitrogen compounds of nitrobenzene, 1-nitronaphthalene, aminobenzene and 2-amine toluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds such as pyran, coumarin and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice.

In another embodiment the composite may be prepared by impregnating the refractory inorganic oxide with a solution of a carbohydrate material such as dextrose, sucrose, fructose, starch, etc., and thereafter drying the impregnated support. After drying, the impregnated support is then subjected to pyrolysis temperatures in the range hereinbefore set forth whereby a carbonaceous pyropolymer similar in nature to those hereinbefore described is formed in at least a monolayer on the surface of the refractory inorganic oxide support.

It has been found that the specific carbon concentration corresponding to a particular conductivity is a function of the pyrolyzable substance used to build the carbonaceous pyropolymer. For example, a carbon concentration of 31.7% in the pyropolymer produced from cyclohexane results in a conductivity of about $4 \times 10^{-3}$ inverse ohm-centimeters, while carbon concentration of 21.1% in the pyropolymer produced from benzene results in a conductivity of about $4 \times 10^{-2}$ inverse ohm-centimeters. This indicates a difference in the pyropolymer structure as between the pyropolymers produced from different pyrolyzable substances. This difference is due to organic residues not included in the extended, conjugated double-bond structure. Such a difference indicates that extraneous carbon structures may be eliminated from the pyropolymer by a proper choice of starting materials. One particularly advantageous choice is a mixture of benzene and o-xylene. Demethylation of the xylene to produce the benzyl radical or diradical promotes the formation of large aromatic polynuclear networks without extraneous, non-conjugated network elements by providing a large concentration of nucleation radicals. This results in an organic semiconducting material having a high conductivity with a relatively low carbon concentration. Similar results can be achieved using mixtures of o-xylene and naphthalene, o-xylene and anthracene, and halogenated or dihalogenated benzene and benzene, naphthalene or anthracene. It has also been found that the greater the temperature of pyrolysis which is employed, the greater will be the conductivity of the resulting product.

In one embodiment the refractory inorganic oxide support which is utilized as one component of the electrocatalyst of the present invention may be ground to the desired size prior to treatment with the organic pyrolyzable compound or, if so desired, the semiconducting material comprising the refractory inorganic oxide containing at least a monolayer of a carbonaceous pyropolymer which consists of recurring carbon and hydrogen atoms on the surface thereof, may be ground to the desired size upon completion of the pyrolysis step of the process. In the preferred embodiment of the invention the particle sizes which are utilized for treatment with the catalytically active metal will range from about 0.5 to about 50 microns in diameter, the preferred size for use in the preparation of an electrode for fuel cells being about 1 micron or less.

Following the preparation of the pyropolymer composite, it is then impregnated with a solution of at least one catalytically active metal to form the desired electrocatalyst material. As hereinbefore set forth, in order to provide an electrocatalyst in which the catalytically active metal or combination of metals which are impregnated on the surface of the carbonaceous pyropolymer fall within the requisite size as well as being present in a minimum of metal crystallite agglomeration, the impregnation is effected by forming a complex of a soluble salt of the catalytically active metal or a combination of soluble salts of catalytically active metals with a sulfur-containing carboxylic acid. The complex is formed by admixing a soluble salt of the catalytically active metal, usually in aqueous form, with the sulfur-containing carboxylic acid, the latter being present in a ratio of from about 1 to about 3 moles of sulfur-containing carboxylic acid per gram atom of catalytically active metal. Examples of water-soluble salts of catalytically active metals which may be employed will include chloroplatinic acid, chloroplatinous acid, platinous chloride, platinic chloride, chloropalladic acid, chloropalladous acid, palladic chloride, palladous chloride, rhenic chloride, rhenous chloride, chlororhenic acid, chlororhenous acid chlororuthenic acid, chlororuthenous acid, ruthenium chloride, tin chloride, germanium chloride, rhodium chloride as well as the corresponding nitrates, sulfates, chlorates, carbonates, etc. The aforementioned water-soluble salts of the catalytically active metals are admixed with sulfur-containing carboxylic acids, and preferably a thio- or mercaptocarboxylic acid, specific examples of these compounds being thiomalic acid, thioglycolic acid, thiocarbonic acid, thiolactic acid, thioglyoxylic acid, thioglyceric cid, thiotartronic acid, thiotartaric acid, etc., mercaptoacetic acid, mercaptopropionic acid, mercaptobutyric acid, mercaptovaleric acid, etc. It is to be understood that the aforementioned water-soluble salts of catalytically active metals and sulfur-containing carboxylic acids are only representative of the type of compounds and that the present invention is not necessarily limited thereto. The amount of catalytically active metal which is employed in the impregnating step of this process will be that which is sufficient to deposit the catalytically active metal or combination of catalytically acitve metals on the surface of the carbonaceous pyropolymer in an amount ranging from about 0.5 to about 20% by weight. Examples of catalytically active metals and mixtures of metals will include platinum, platinum and rhenium, platinum and rhodium, platinum and tungsten oxide, platinum and nickel, platinum and ruthenium, platinum and lead, platinum and germanium, palladium, palladium and rhenium, palladium and rhodium, palladium and tungsten oxide, palladium and nickel, palladium and ruthenium, palladium and lead, palladium and germanium, etc. By utilizing a composite of the salt of the catalytically active metal and the sulfur-containing compound it is possible to impregnate the surface of the carbonaceous pyropolymer in such a manner so that the crystallite size of the catalytically active metal will be maintained as small as possible, the mean diameter of the crystals being in a range of from about 10 to about 50 Angstroms. In addition, by utilizing the sulfur-containing carboxylic acids, it is possible to minimize the crystallite agglomeration of the catalytically active metal thereby affording a greater surface area of the metal which will enable the electrocatalyst to operate in a more efficient manner for a longer period of time when utilized as a component in an electrode.

The impregnation of the carbonaceous pyropolymer composite is effected by admixing the complex with the composite in any suitable manner in order that the composite be thoroughly impregnated with the solution. In one embodiment of the invention the impregnation of the composite is effected in a series of steps, the number of steps ranging from 2 to about 4 or more. When this type of operation is employed, the solution of the complex is divided into equal portions, the first portion being used to impregnate the composite which is thereafter dried and reduced in the presence of hydrogen at elevated temperatures ranging from about 100° to about 600° C. for a period of time ranging from bout 0.5 to about 4 hours or more. The impregnation step is then repeated followed by further drying and further reduction until the predetermined amount of catalytically active metal is impregnated on the surface of the carbonaceous pyropolymer.

The electrocatalyst of the present invention may then be utilized as a component of an electrode for an electrochemical cell such as a fuel cell by admixing the thus prepared electrocatalyst with a support. The electrode may be prepared in any manner known in the art. For example, the electrocatalyst of the present invention which has been prepared in a manner hereinbefore set forth may be blended with a powder of polytetrafluoroethylene and the resulting mixture may be suspended in a suitable solvent such as water or an alcohol to form a co-suspension which is then deposited in any manner so desired on a substrate. The substrate may comprise any desired compound such as a tantalum screen or a porous graphite, the deposition being accomplished or achieved by screen printing, spraying, filter transfer process, etc. The composite consisting of the substrate with the co-suspension deposited thereon may then be heated at an elevated temperature ranging from about 300° to about 400° C. for a period of time sufficient to sinter the polytetrafluorethylene which will cause the polytetrafluoroethylene to diffuse and allow the electrocatalyst to adhere to the carrier or substrate. While this is one example of how an electrode for a fuel cell may be prepared, it is contemplated that any other method known in the art may also be employed to prepare the desired composite.

The electrodes thus prepared may be utilized in either alkaline or acid fuel cells. For example, the electrode may be used in an alkaline fuel cell comprising a housing formed of a suitable insulating material such as plexiglas provided with openings for the insertion of conducting wire leads. The housing is provided with a central hollow portion which forms a containment well for the electrolyte material such as sodium hydroxide, ammonium chloride, etc. A zinc anode may be cemented to one interior wall of the containment well. In addition, an air well which possesses a communicating air inlet formed on the top portion of the housing and a communicating air vent formed on the lower portion of the housing is formed within said housing. A cathode comprising an electrode of the type of the present invention may be pressed between the electrolyte well and the air well. Another type of fuel cell which may be employed comprises the acid type fuel cell in which the electrode of the type herein described is affixed to a tantalum screen or a porous graphite current collector which is then placed on each side of a composite matrix. In addition, plates configured for the passage of air, oxygen and hydrogen and containing leads are pressed to the current collector to form the desired fuel cell. Air or oxygen may be passed through the plates to the electrodes which act as cathodes while hydrogen is passed through the plates to the electrodes which are utilized as fuel cell anodes.

As will hereinafter be shown in greater detail in the examples appended to the specification, the electrodes containing the electrocatalysts of the present invention may be utilized in fuel cells, the performance of the electrodes after a relatively lengthy period of time exhibiting an efficiency which may slightly decrease during the duration of the period in which the electrodes are in use, but not to the point which would impair cell performance.

The following examples are given to illustrate the preparation of the electrocatalysts of the present invention and to their use in electrodes. However, these examples are given merely for purposes of illustration and are not intended to limit the generally broad scope of the present invention in strict accordance therewith.

EXAMPLE 1

In this example a gamma-alumina base was ground to a particle size of from 1.3 to 2.5 microns. The alumina substrate had an apparent bulk density of 0.30, a surface area of from 70–75 square meters per gram ($m^2/g$) and a pore diameter of about 100 Angstroms. The base was calcined at a temperature of about 550° C. for a period of about 3 hours following which the powder was placed in a fluidized bed reactor and treated with benzene by passing said benzene over the alumina at a temperature of about 900° C. for a period of 1.5 hours. Following this, the semiconducting carbonaceous pyropolymeric refractory inorganic oxide material was stabilized for an additional period of 1.5 hours at atmospheric pressure. The material had a carbon content of 34.1 wt. % and a resistivity at room temperature of 0.02 ohm-centimeters.

A complex of chloroplatinic acid and thiomalic acid was prepared by admixing 3 moles of thiomalic acid per 1 gram atom of platinum in an aqueous system. This complex was prepared by admixing 10.32 grams of an aqueous chloroplatinic acid solution containing 27.19% platinum with 6.47 grams of thiomalic acid and 60 grams of de-ionized water. After admixing the solution it was allowed to stand for 18 hours at room temperature in order to insure formation of the complex and was thereafter divided into two equal portions. Twenty-five grams of the semiconducting carbonaceous pyropolymeric refractory inorganic oxide base was treated with one-half of the complex in an impregnation step which consisted in admixing the two components with stirring for a period of 0.5 hours at 25° C. At the end of this period, the impregnated base was dried in a static oven at a temperature of 110° C. for a period of 3.5 hours. Following this the dried base was then reduced in a stream of hydrogen at a temperature of 260° C. for a period of 2 hours. Analysis of this electrocatalyst showed that there was 4.9 wt. % platinum present, the crystallite size of said platinum having a nominal diameter of less than 25 Angstroms with only 1% agglomeration.

The preceding electrocatalyst was then treated with the remaining half portion of the chloroplatinic acid-thiomalic acid complex, dried at a temperature of 110° C. for a period of 3.5 hours and reduced for a period of 2 hours in a stream of hydrogen at a temperature of 260° C. Analysis of the electrocatalysts which had been impregnated two times with the complex disclosed that said electrocatalyst contained 9.84 wt. % platinum, the crystallite size of said platinum having a nominal diameter of 34 Angstroms with a 3% agglomeration.

EXAMPLE II

In a manner similar to that set forth in Example I above, a semiconducting carbonaceous pyropolymeric refractory inorganic oxide material was prepared using the same technique. Following the preparation of the material it was impregnated with an aqueous chloroplatinic acid solution which did not contain any thiomalic acid. After drying and reducing the impregnated base it was found that said base contained 9.73 wt. % platinum in which the crystallite size of said platinum was 76 Angstroms and the agglomeration was 49%.

EXAMPLE III

An electrocatalyst which was prepared in a manner similar to that set forth in Example I above was utilized to prepare an electrode for use in fuel cells. The electrocatalyst which, after impregnation of a gamma-alumina substrate containing a carbonaceous pyropolymer thereon with a complex of chloroplatinic acid and thiomaleic acid, was analyzed and found to contain 9.84 wt. % of platinum, the crystallite size of said platinum having a nominal diameter of 34 Angstroms with a 3% agglomeration. The electrocatalyst was wet blended with a polytetrafluoroethylene powder in an organic medium and after filtration a catalyst layer was formed by a calendering operation. The layer was then pressed onto a tantalum screen current collector and admixed in a nitrogen atmosphere at a temperature of about 330° C. The catalyst layer was about 0.005 cm thick with a 0.50 mg/cm$^2$ loading of the catalyst material.

The evaluation of the electrode was accomplished by forming a fuel cell in which the cell plates comprised a composite material molded from graphite and an acid resistant resin. The cell matrix consisted of a composite structure of Kynol fibers and phenolic binder, said cell matrix being filled with phosphoric acid which had been pretreated with hydrogen peroxide. The electrodes were pressed on each side of the cell matrix and tested as fuel cell cathodes operating on air or oxygen. The electrocatalyst when tested in a fuel cell in air at a temperature of 140° C. showed a current density of about 100 milliamps per cubic centrimeter (ma/cm$^2$) and a voltage of 0.63 volts (voltage having been corrected to eliminate internal and lead resistance effects). When the electrode was used as an oxygen cathode, the current density was 120 ma/cm$^2$ at a voltage of 0.73 volts.

Other electrocatalysts which may be prepared by impregnating gamma-alumina which contains a carbonaceous pyropolymer on the surface thereof and which has been impregnated by utilizing aqueous solutions of chloropalladic acid, or mixtures of aqueous solutions of chloroplatinic acid and rhenium chloride or chloroplatinic acid and rhodium chloride which have been complexed with from 1 to 3 moles of thioglycolic acid, mercaptoacetic acid, mercaptopropionic acid or mercaptobutyric acid and thereafter dried and reduced in the presence of hydrogen at elevated temperatures of from about 100° to about 600° C. may exhibit polarization curves similar in nature to the hereinbefore described electrocatalyst.

I claim as my invention:

1. A method for the preparation of an electrocatalyst which comprises treating a refractory inorganic oxide with a pyrolyzable organic compound at pyrolysis conditions to form at least a monolayer of a carbonaceous pyropolymer on the surface of said refractory inorganic oxide, thereafter impregnating the resulting composite with a complex of a soluble salt of at least one catalytically active metal and a sulfur-containing carboxylic acid, heating the impregnated composite to a temperature sufficient to remove the solvent, reducing the dried composite and recovering the resultant electrocatalyst.

2. The method as set forth in claim 1, in which said pyrolysis conditions include a temperature in range of from about 400° to about 1200° C. in a reducing atmosphere.

3. The method as set forth in claim 1 in which said temperature sufficient to remove the solvent is in a range of from about 100° to about 250° C.

4. The method as set forth in claim 1, in which the dried composite is reduced in the presence of hydrogen at a temperature in the range of from about 100° to about 600° C.

5. The method as set forth in claim 1 in which said refractory inorganic oxide is an alumina.

6. The method as set forth in claim 5 in which said alumina is gamma-alumina.

7. The method as set forth in claim 1 in which said catalytically active metal is platinum.

8. The method as set forth in claim 1, in which said catalytically active metal is palladium.

9. The method as set forth in claim 1 in which said catalytically active metal is a mixture of platinum and rhenium.

10. The method as set forth in claim 1 in which said catalytically active metal is a mixture of platinum and rhodium.

11. The method as set forth in claim 1 in which said sulfur-containing carboxylic acid is thiomalic acid.

12. The method as set forth in claim 1, in which said sulfur-containing carboxylic acid is thioglycolic acid.

13. The method as set forth in claim 1, in which said sulfur-containing carboxylic acid is mercaptoacetic acid.

14. The method as set forth in claim 1, in which said sulfur-containing carboxylic acid is mercaptopropionic acid.

15. The method as set forth in claim 1, in which said sulfur-containing carboxylic acid is mercaptopbutyric acid.

* * * * *